United States Patent

[11] 3,547,224

[72] Inventor Robert G. Watts
3803 Sullivant Ave., Columbus, Ohio 43228
[21] Appl. No. 745,835
[22] Filed July 18, 1968
[45] Patented Dec. 15, 1970

[54] COMPOSITE TOWER STRUCTURE
25 Claims, 18 Drawing Figs.
[52] U.S. Cl............................................. 182/16, 182/179
[51] Int. Cl........................................... E04g 1/16
[50] Field of Search.......................... 182/178, 179, 20, 152, 16; 52/637, 638

[56] References Cited
UNITED STATES PATENTS
3,204,721 9/1965 Park.............................. 182/178
3,156,317 11/1964 Lundeen....................... 182/16
3,282,375 11/1966 Ray................................. 182/20

Primary Examiner—Reinaldo P. Machado
Attorney—Burns, Doane, Benedict, Swecker & Mathis ABSTRACT: A composite tower structure having inner and outer tower components which may be easily assembled and disassembled and which may be compactly packaged for storing or shipping. The inner tower component includes an upper portion which extends through an aperture in the outer tower component; and a lower portion. The lower portion includes a main panel member having a plurality of rigidly interconnected legs, a main leg and a plurality of truss members which are spaced along the axial lengths of the legs. These members may be easily detachably connected to form a rigid lower portion.

The outer tower component includes a plurality of legs pivotally attached to a top platform by hinge units having rigidly interconnected spindles which telescopically engage tubular members of the legs. One of the hinge units has separable spindles which may be individually engaged with the legs and then secured together thereby greatly facilitating the assembly of the outer tower component.

In addition, a unique trailer for transporting the composite tower structure is provided. The trailer utilizes a section of the tower to support the remainder of the tower and to connect the trailer to a pulling vehicle. Adapters are provided to adapt the trailer to utilize different sections of the tower structure.

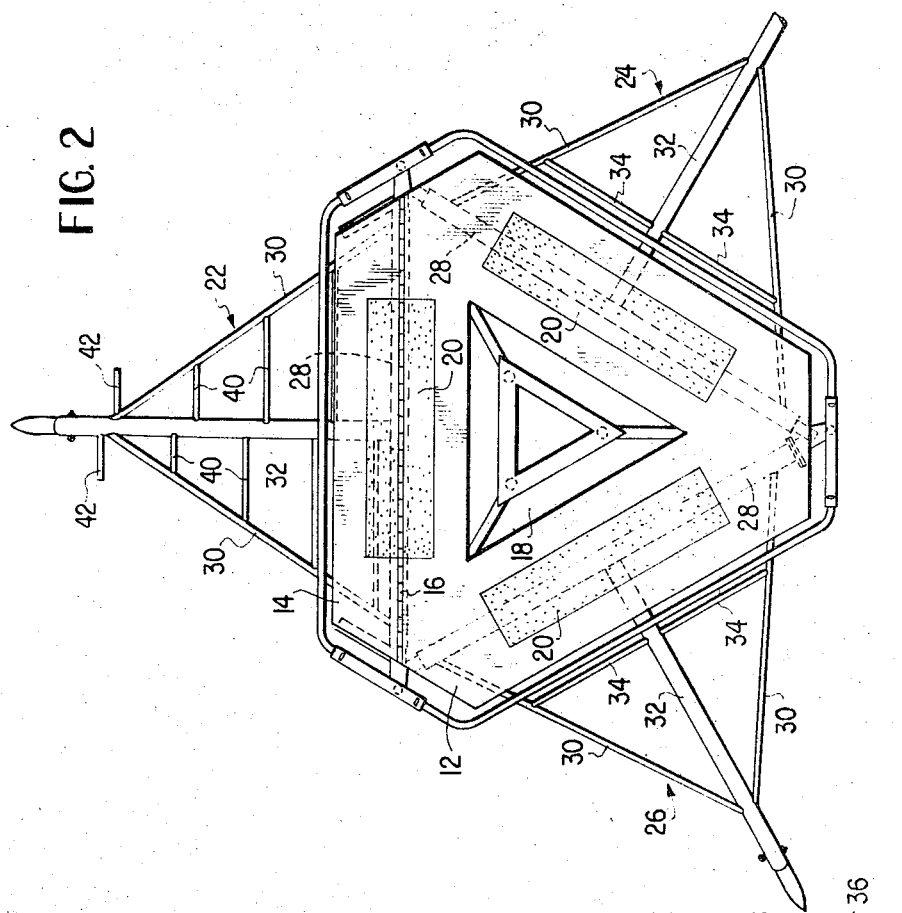
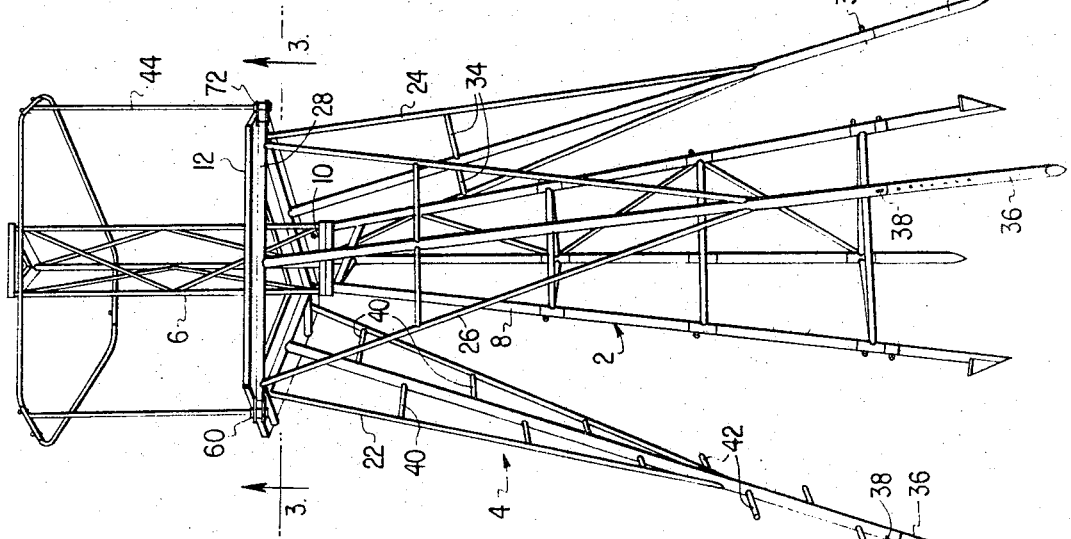
INVENTOR
ROBERT G. WATTS

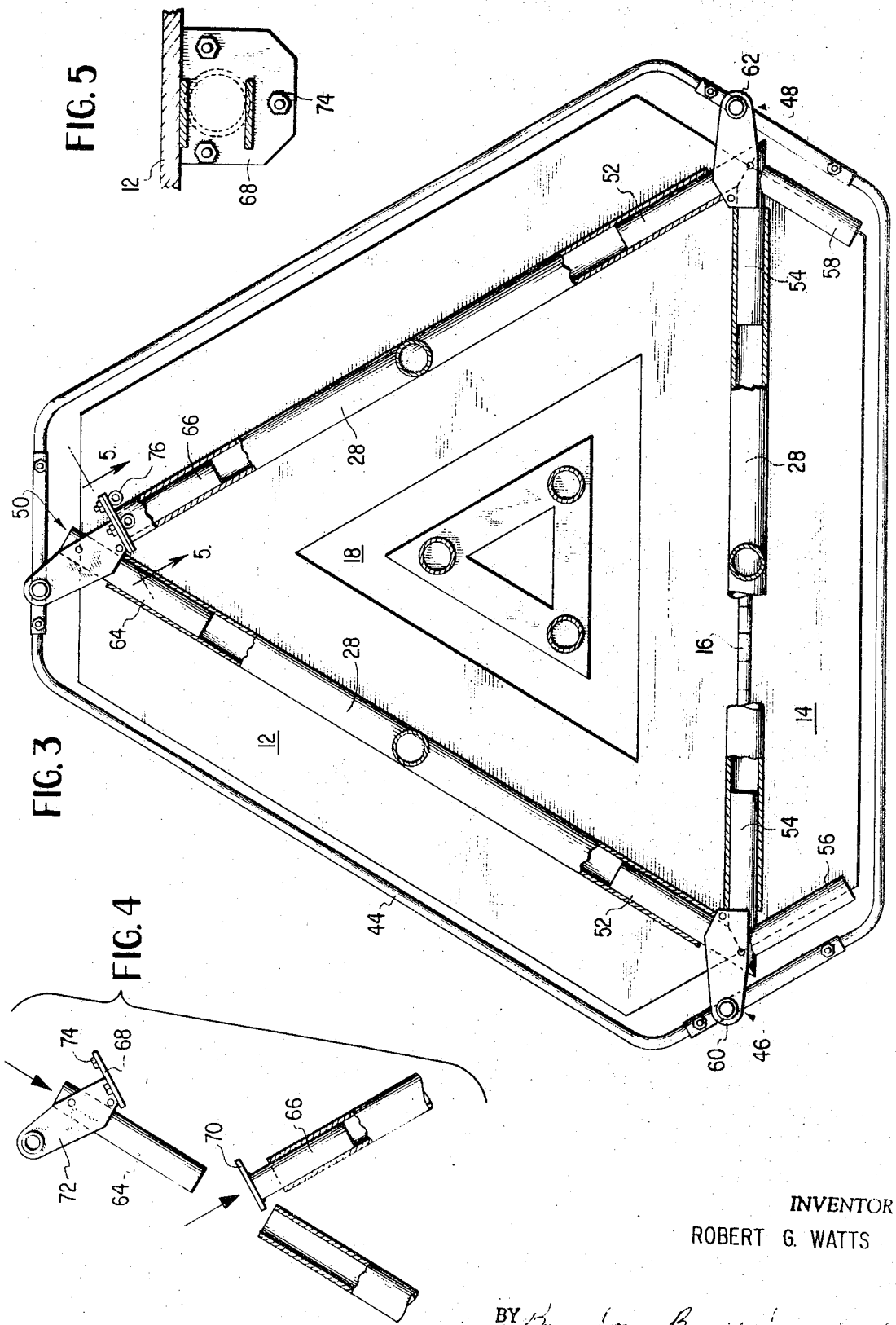

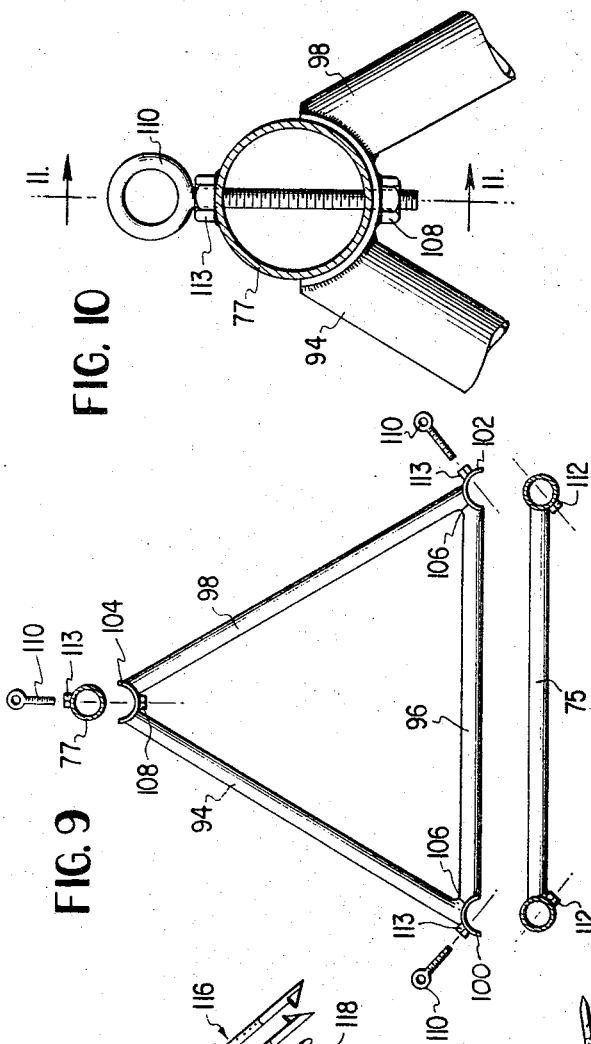

PATENTED DEC 15 1970
3,547,224
SHEET 4 OF 5
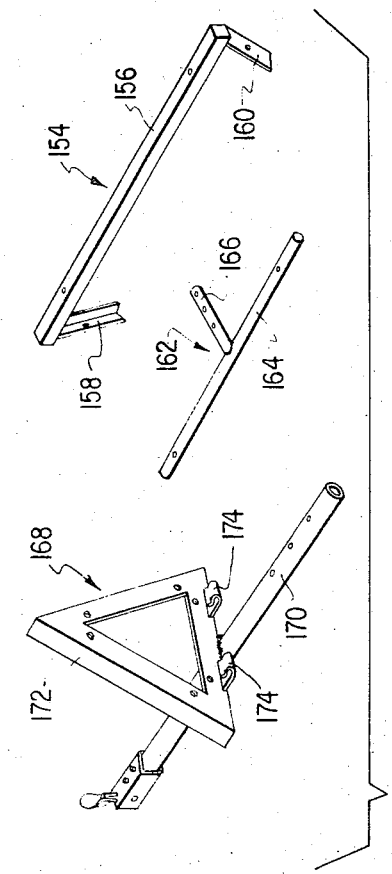
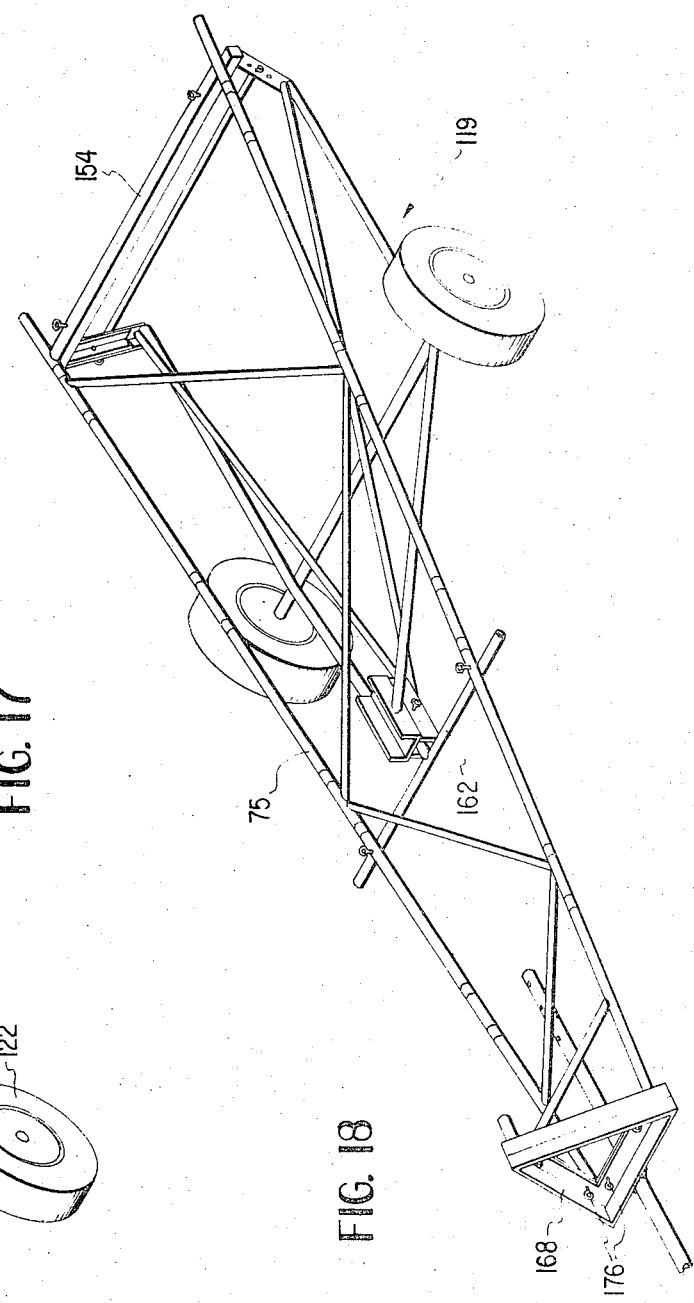
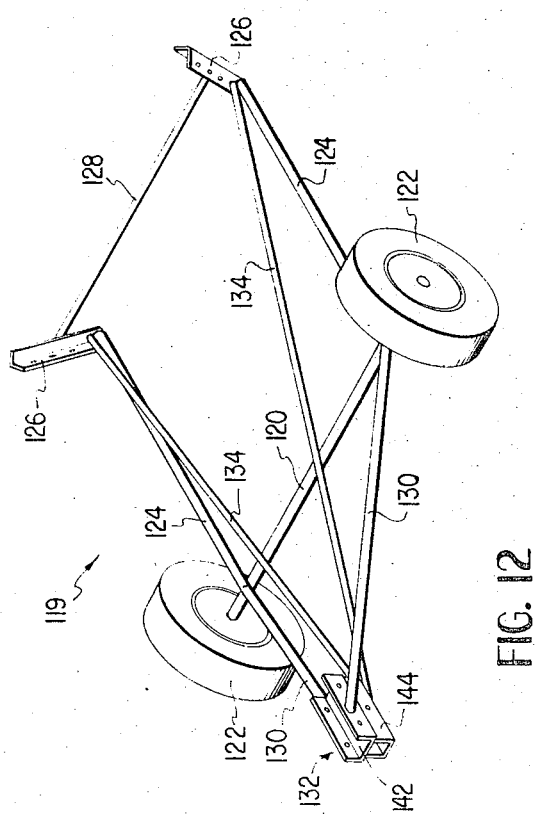
INVENTOR
ROBERT G. WATTS
BY Burns, Doane, Benedict, Swecker & Mathis
ATTORNEYS

PATENTED DEC 15 1970

INVENTOR
ROBERT G. WATTS

BY Burns, Doane, Benedict, Swecker & Mathis

ATTORNEYS

3,547,224

COMPOSITE TOWER STRUCTURE

BACKGROUND OF THE INVENTION

This invention relates to a composite tower structure which includes both inner and outer tower components and to methods of tower storage, transport and assembly. Specifically, this invention relates to improvements in the composite tower structure disclosed in the Watts et al. U.S. Pat. No. 3,289,364 and assigned to the present applicant. The disclosure of the Watts et al. patent is hereby incorporated by reference.

The Watts et al. patent discloses a composite tower structure uniquely adapted for surveying operations. The inner tower component may be used to support a surveying instrument in an elevated position, while the outer tower provides an independent, elevated working platform. Specifically, the Watts et al. patent discloses a composite tower structure including a rigid inner tower and an outer tower having a top platform with a plurality of legs pivotally connected thereto. The top platform is apertured to allow an upper portion of the inner tower to project therethrough. The Watts et al. patent also discloses methods of tower erection and storage which are applicable to the present invention. While the Watts et al. tower has proven successful in overcoming the disadvantages of previously known towers, the present invention is directed to improvements thereof which materially facilitate their shipping, handling and assembly.

First, it is an object of the present invention to provide a composite tower structure which may be broken down to reduce the space required for shipping the tower. Since shipping rates are based on bulk weight, carriers object to shipments having a high volume-to-weight ratio. Such shipments are often delayed so that the carrier may effectively utilize his capacity. The present invention avoids such delays by a breakdown tower structure which may be compactly packaged. The breakdown tower structure, however, must be easily assembled by the user, either in the field or when received.

It is therefore a further object of the present invention to provide a breakdown tower structure which may be easily assembled. To accomplish this, the present invention provides relatively few members in comparison with previously known breakdown towers and may be assembled by hand by a single worker. In assembling the outer tower, it may be difficult for a single worker to engage the pivotable legs to the rigid, interconnected spindles of the corner hinge units of the Watts et al. patent, since all of the hinge units must be advanced into the legs simultaneously.

It is therefore another object of the invention to provide a composite tower structure with an improved hinge unit to facilitate the assembly of the outer tower component. To accomplish this, one of the hinge units includes separable spindles which may be individually engaged with the pivotable legs of the outer tower and then secured together to provide an interconnected hinge unit.

While the Watts et al. patent discloses a convenient method for transporting the composite tower by means of pickup truck, it has been desired to be able to transport the composite tower structure by means of a trailer which may be connected to any conventional vehicle.

It is therefore still another object of this invention to provide an inexpensive trailer on which the composite tower structure can be easily mounted and adequately supported for transport between or to field sites. A trailer to accomplish this utilizes either one of the pivotable legs or a main panel member of the inner tower, which is mounted on it, to support the rest of the tower structure and provide a convenient connection to the pulling vehicle.

These objects are accomplished in accordance to this invention by a composite tower structure which includes inner and outer tower components which can be broken down into relatively few, easily assembled parts. The inner tower includes a main panel member comprising a plurality of rigidly interconnected legs which converge towards each other at one end, and a rigid top member connected at the converging end and extending transversely to the longitudinal axis of the panel member. A plurality of truss members are detachably connected to the legs of the panel member spaced along its longitudinal length. A main leg is then detachably connected to the rigid top member and to the truss members to provide a rigid inner tower.

The outer tower component includes an apertured top platform having a plurality of legs pivotally connected thereto. These pivotable connections are provided by hinge units having first and second spindle members, each of which telescopically engages the end of one of the legs. To facilitate the assembly of this component, one of the hinge units includes separable spindle units which may be individually engaged with an end of a leg and then detachably secured together.

The tower may be transported by a trailer including a pair of wheels rotatably connected to the ends of an axle. The trailer has support means carried by the axle on which one of the pivotable legs or the main panel member may be mounted. This support means includes a forwardly extending portion having upright and inclined supports.

When one of the pivotable legs of the outer tower is mounted on the trailer, platform supporting members extending from two of the hinge units of the leg are detachably connected to the upright members, and the lower portion of the leg is received in the channel support member. Hitch means telescopically engages the leg to connect the trailer to a pulling vehicle. The rest of the composite tower is supported on the mounted leg.

When the main panel member of the inner tower is mounted on the trailer, the lower portion of the panel member is detachably connected to a horizontally extending adapter connected to the upright supports and the midportion is detachably connected to a T-shaped adapter received in the channel support. The hitch means telescopically engages a hitching adapter connected to the rigid top member of the main panel.

BRIEF DESCRIPTION OF THE DRAWINGS

FIG. 1 is a perspective view of an assembled and erected composite tower structure;

FIG. 2 is a top view of the assembled and erected composite tower structure shown in FIG. 1;

FIG. 3 is a sectional view of the hinge arrangement employed to pivotally mount tower legs on the tower, taken along section lines 3–3 of FIG. 1;

FIG. 4 is an exploded view of a separable hinge unit and the assembly thereof, with the pivotally mounted legs of the outer tower;

FIG. 5 is a sectional view of the showing of the mounting plates of the separable hinge unit, taken along section lines 5–5 of FIG. 3;

FIGS. 6—8 illustrate the inner tower structure in varying stages of assembly;

FIG. 9 is a top view of the truss member illustrating its connections to a main panel member and a main leg;

FIG. 10 is an enlarged view of the interconnection of the truss member with the main leg;

FIG. 11 is a sectional view of the interconnection of the truss member with the main leg taken along section lines 11–11 of FIG. 10;

FIG. 12 is a perspective view of the trailer for transporting the composite tower which forms part of the present invention;

FIG. 17 illustrates the adapters used to mount the main panel member on the trailer; and FIG. 18 is an exploded view of the adapters in place in the trailer and the main panel member as mounted thereon.

Referring to FIGS. 1 and 2, the composite tower structure includes an inner tower component 2 and an outer tower component 4. The inner tower component includes an upper portion 6 and a lower portion 8 which will be described in detail hereinafter.

Figure 13:
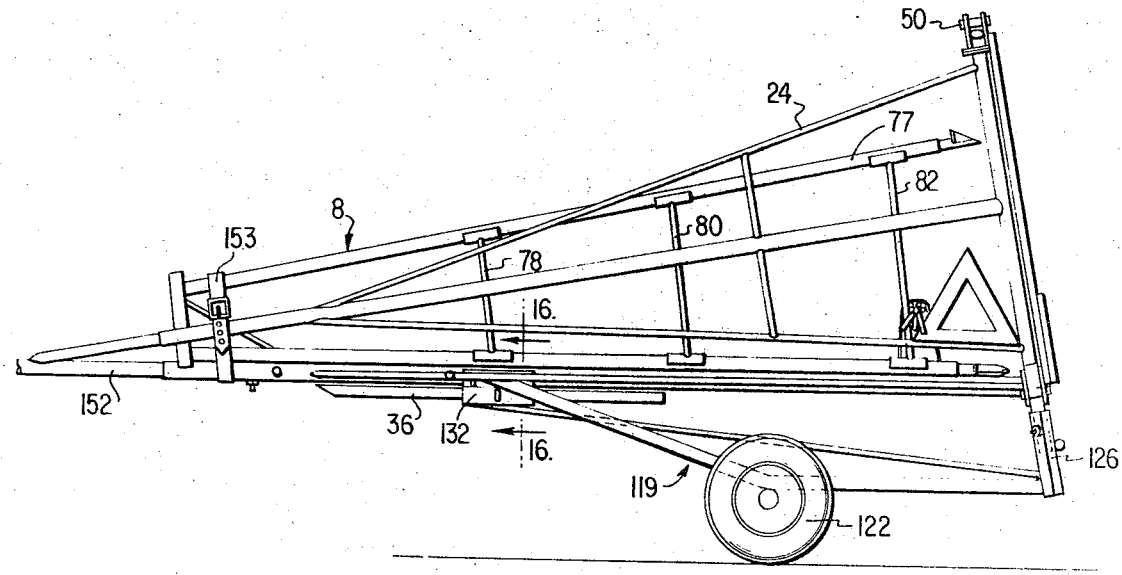
FIG. 13 illustrates a side view of the composite tower structure supported on the trailer by means of one of the pivotable legs.

The upper portion 6 is triangular in cross section and is detachably secured to the upper end of lower portion 8 by any conventional securing means such as eye bolts 10.

The outer tower component includes a top platform 12 which is triangular in shape. One of the sides of the top platform 12 includes a lip portion 14 which may be pivotably joined to the remainder of the platform by any conventional hinge such as piano hinge 16. The lip portion 14 is hinged so as to pivot upward and rest on the adjacent portion of the platform 12. The top platform further includes a central aperture 18 which may be triangular in shape through which the upper portion 6 may extend as shown in FIG. 1. The top platform may further include nonskid mats 20 as a safety feature.

The outer tower component 4 includes a plurality of legs 22, 24, and 26 pivotably connected to the underside of the top platform 12. Each of the legs includes a tubular laterally extending member 28 and a pair of framing members 30 which form a junction with a central support member 32.

The support member 32 extends from a central portion of the tubular member 28. Laterally extending framing members 34 may be positioned between the framing members 30 and central support 32 for added strength. Furthermore, the legs may be of an extensible character by telescoping extension pieces 36 which are detachably connected to the lower portion of the central support member 32 by any conventional securing means such as eyebolts 38.

One of the pivotable legs may provide a ladder for allowing an operator to ascend to the top platform 12 by staggering the lateral frame members between the side framing members and the central support as shown by framing members 40 on the leg 22. Additional rungs 42 may be added to the central support 32 below the juncture of the side framing members 30 and the central support 32.

As seen from FIGS. 1 and 2, the ladder-defining leg is disposed beneath the pivotable lip portion 14. An operator may then climb the ladder leg, pivot the lip portion back onto the remainder of the platform 12 so that he may climb onto the platform 12. A personnel railing 44 may also be mounted on the outer tower component 4.

Referring to FIGS. 3, 4, and 5, legs of the outer tower component 4 are connected to the underside of top platform 12 by means of hinge units 46, 48, and 50. The hinge units 46 and 48 include rigidly interconnected spindle members 52 and 54 which are telescopically engaged with one end of the tubular member 28 of a tower leg. Hinge units 46 and 48 further include platform supporting members 56 and 58, respectively, which extend outwardly and are inclined towards each other for supporting the lip portion 14. In addition, the hinge units 46 and 48 include personnel railing mounting plates 60 and 62 which, as can be seen from FIG. 1, include spaced parallel members having means for receiving the railing support members at their outer end. The mounting plates 60 and 62 are of such a thickness as to provide vertical clearance between the tubular members 28 and the top platform 12 to allow the legs to rotate freely about the spindle members on which they are mounted.

To facilitate the engagement of the hinge units with the tubular members 28 of the pivotable legs, the hinge unit 50 includes separable spindle members 64 and 66 which may be individually engaged with the ends of the tubular members and then detachably secured together by threaded fasteners to form a rigid hinge unit.

The separable spindle 64 and 66 may be secured together by securing plates 68 and 70 which are connected to the spindles respectively. Mounting plate 68 is inclined to the longitudinal axis of the spindle 64 and is connected to personnel railing mounting plate 72. The mounting plate 72 is similar to the mounting plates 60 and 62 of hinge units 46 and 48 respectively. The spaced parallel members of mounting plate 72 are connected to opposite sides of the spindle 64 and inclined to the axis of the spindle. They extend beyond the edge of the spindle to support securing plate 68 which may include a plurality of nuts 74 attached thereto. Securing plate 70 is connected directly to one end of spindle 66 substantially transversely to the axis of the spindle 66. Securing plates 68 and 70 may be detachably secured by any conventional means such as threaded eyebolts 76.

In assembling the outer tower component, rigidly interconnected hinge units 46 and 48 would first be inserted into adjacent ends of the tubular members 28. The separable spindles of hinge unit 50 would then be inserted individually into the adjacent ends of tubular members 28 and then secured to each other by means of eyebolts 76 through securing plates 68 and 70. The top platform 12 would then be secured to the upper members of mounting plates 46, 48 and 72. The personnel railing 44 could then be secured to the mounting plates 60, 62 and 72 by insertion in the receiving means. Thus, the outer tower component may be easily assembled or disassembled for compact storage or shipping.

The inner tower component 2 as described earlier includes an upper portion 6 and a lower portion 8. Referring to FIGS. 6 through 11, the lower portion 8 of the inner tower component 2 includes a main panel member 75, main leg 77 and truss members 78, 80 and 82. The main panel member 75 specifically includes legs 84 and 86 which are rigidly interconnected by bracing members 88. The legs 84 and 86 of the main panel member converge toward each other at one end and terminate at a rigid top member 90 which extends substantially transverse to the longitudinal axis of the main panel member. The rigid top member 90 includes a main leg cylindrical receiving means 92 and is supported by knee braces 93.

The truss members 78, 80 and 82 are triangular in shape and are of increasing cross-sectional size so as to interconnect the main panel member 75 with the main leg 77 to form a rigid inner tower component of substantially triangular cross section with diverging legs. The truss members 78, 80 and 82, as respectively shown in FIG. 9, each include tubular side members 94, 96 and 98 which are connected to semicylindrical mounting members 100, 102, and 104 at each corner.

As can be seen from FIG. 9, the side members 94, 96 and 98 are connected to the semicylindrical mounting members 100, 102 and 104 to form a triangular shape. In addition, pairs of side members 94 and 96; and 96 and 98 are also connected. The semicylindrical mounting members 100 and 102 are connected to interconnect side members at point 106. These support means 100 and 102 are adapted to engage legs 84 and 86 of the main panel member. The semicylindrical mounting member 104 is adapted to engage main leg 77 and includes a nut 108 attached thereto for threadably receiving any conventional securing means such as eyebolts 110. In addition, the legs 84, 86 have a plurality of nuts 112 attached thereto along their axial length to receive eyebolts 110. These eyebolts pass through semicylindrical mounting members 100 and 102 and the respective legs 84 and 86. The semicylindrical mounting members 100 and 102, as well as main leg 77, have bored-out nuts or bushings 113 to serve as bosses for the eyebolts 110.

All of the legs are provided with apertures to receive eyebolts 110 in the proper position thereon. The legs are also provided with stop members 114, as shown in FIG. 11. These members 114 are spaced along the axial length of the legs and serve to support and position the semicylindrical mounting members of the trusses.

Additionally, the inner tower component may include extension pieces 116 which may be telescopically received in each leg and be adjustably positioned and secured therein.

These extension members may include "steps" 118 to facilitate securing the inner tower component in a firm position on the ground. All of the trusses are exactly the same structurally only being different in overall size.

In assembling the inner tower component, truss members 78, 80 and 82 are secured to the legs of the main panel 75 by means of eyebolts 110. These bolts extend through the bosses 113 and the apertures provided along the axial length of the legs to engage the nuts 112. The main leg 77 is then received in the cylindrical receiving means 92 of the rigid top member 90 and secured to each of the semicylindrical mounting members 104 by eyebolts 110. These eyebolts extend through the boss 113 and the apertures in the main leg to engage the nuts 108.

The inner tower component, as illustrated, includes only three truss members. However, as many truss members as necessary may be used to provide firm support for the inner tower structure. It has been found that three truss members are sufficient for towers of approximately 18 feet in height. For a larger tower such as one which extends 25 feet, four truss members would be necessary. In such larger towers it has also been found that additional cross braces extending between the main leg and the legs of the main panel are usually required to provide increased rigidity.

A trailer 119 suitable for transporting the composite tower structure is disclosed in FIG. 12. The trailer 119 includes an axle 120 on which wheels 122 are rotatably mounted. Parallel transversely spaced rearwardly extending frame members 124 terminate in a pair of upright supports 126. A laterally extending horizontal frame member 128 may be connected between the upright supports. The upright supports 126 are angular members having two sides adapted to engage a tubular member mounted therein. The upright supports 126 are inclined upwardly and outwardly from the parallel framing members 124.

The trailer 119 further includes horizontally and inwardly converging framing members 130 which are joined together by means of a horizontally and longitudinally extending support member 132. In addition, horizontally and inwardly converging framing members 134, extending from the uprights 126 to the horizontal and longitudinally extending support member 132, may be included.

The trailer 119 is adapted to support one section of the composite tower structure upon which the rest of the tower may be supported. The section of tower utilized serves as an integral part of the trailer structure and provides the connection for hitching means to the pulling vehicle.

Figure 14:
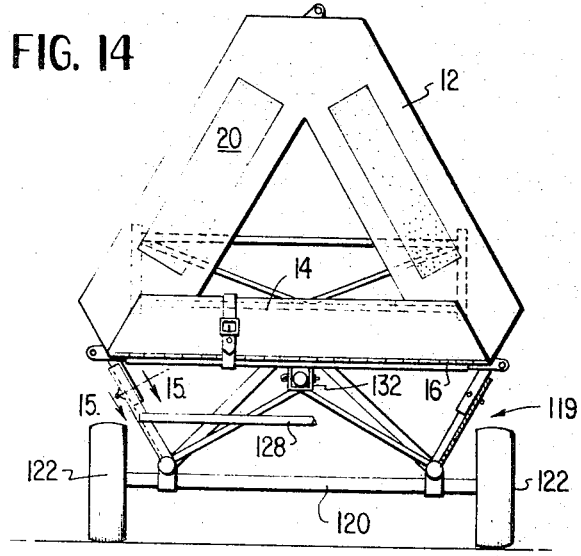
FIG. 14 is an end view, partially cut away, of the composite tower structure in combination with the trailer.
Figure 15:
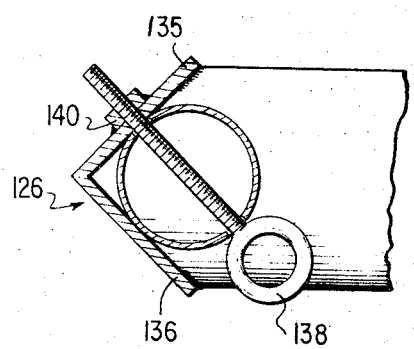
FIG. 15 is an enlarged view of the rearwardly extending upper leg portion supporting structure of the trailer.

Specifically, when using a tower structure of the 18-foot size, the pivotable leg 22 of the outer tower structure is used as the supporting section. Referring to FIGS. 13—16, the platform supporting members 56 and 58 which support the lip portion 14 of the top platform 12 are secured to the inclined angle supports 126 as shown in FIG. 15. The tubular support members are nested between the angle portions 135 and 136 of each support 126 and are secured thereto by eyebolts 138, each of which is threadably engaged with nut 140 secured to the outer side of angle portion 135.

Figure 16:
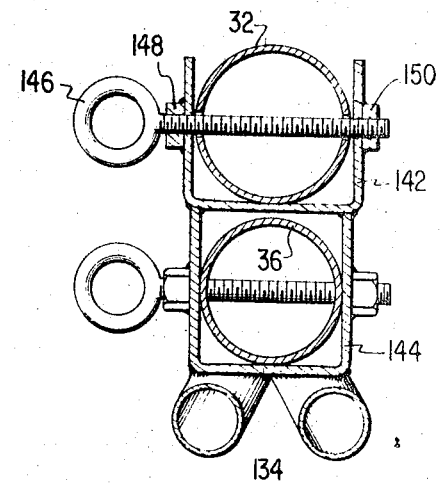
FIG. 16 is an enlarged view of the forwardly extending lower portion holding structure of the trailer.

The horizontal and longitudinally extending support member 132 may comprise two U-shaped channels 142 and 144 in vertical juxtaposition to one another as shown in FIG. 16. The central support 32 of the pivotable leg 22 is supported in the upper channel 142 and secured in place by eyebolt 146. Bolt 146 is supported by a boss or bushing 148 and threadably engaged with nut 150.

The extensible leg 36 of the central support 32 of the supporting leg 22 may be placed in the lower channel 144 and held in place in a similar manner. A hitch 152 may then be telescopically engaged in the central support 32 of the supporting leg section.

The hitch 152, as shown in FIG. 13, includes conventional connecting means at its outer end (not shown) such as a socket to engage a ball provided on the vehicle.

The remainder of the tower is supported on the supporting leg 22, as shown in FIG. 13, by placing the other two legs of the outer tower in a somewhat diverged position, and then placing the lower end of the lower portion 8 of the inner tower component 4 within the space formed by the diverged legs. The inner tower component is then advanced until the lower portion abuts the platform 12 of the outer tower. The remaining gear, such as the upper portion of the inner tower component 4 and the personnel railing may be rested within the legs and secured in place as shown in FIG. 13. A strap 153 may serve to secure the free ends of legs 24 and 26, with tower 8 nested between these free ends.

When a larger tower, such as a 25-foot high tower, is being transported, it has been found that it is more advantageous to utilize the main panel member 75 of the inner tower as the supporting section. In this event adapters as illustrated in FIG. 17 must be connected to the trailer 119.

These adapters include a horizontally extending adapter 154 which includes a lateral framing member 156 and inclined vertical members 158 and 160. The inclined members 158 and 160 are received by the inclined supports 126 as shown in FIG. 14 in the same manner as the platform supporting members 56 and 58. In addition, a laterally extending adapter 162 comprising a T-shaped member is provided. Adapter 162 includes a laterally extending frame member 164 and a longitudinally extending member 166. Member 166 is telescopingly received in the lower U-shaped channel 144 of the horizontal and longitudinally extending support 132. These adapters 154 and 162 are suitably apertured to be detachably secured to the trailer by way of bolts, etc.

As illustrated in FIG. 18, the main panel member 75 is secured to the trailer 119 by positioning the lower end of panel 75 on the horizontal framing member 156 of the adapter 154. Threaded fasteners serve to detachably secure legs 84 and 86 of panel member 75 to the member 156. The legs of the main panel member 75 are also secured by threaded fasteners to both ends of the laterally extending member 164 of the T-shaped adapter 162.

The hitch 152 is connected to the main panel member 75 by means of a hitching adapter 168. This adapter 168 includes a longitudinally extending member 170 on which is mounted a triangular connecting member 172. Dimensionally member 172 is the same size as the rigid top member 90. The hitching adapter 168 includes hooks 174 which engage the lower edge of the rigid top member 90. Adapter 168 is secured in flush engagement with the rigid top member 90 be means such as eyebolts 176. The hitch 152 may then be telescopically received by the tubular longitudinal member 170 of the hitching adapter and pinned in place.

The remainder of the composite tower structure may then be supported on the main panel member 75 by converging the legs 22, 24, and 26 of the outer tower component 4. The outer tower 4 is then manipulated to project the converged legs through the rigid top member 90, with the "lower" end of tower 4 resting on crossmember 154. Threaded fasteners or straps may be employed to secure tower 4 in this position.

Thus the present invention provides an improved, composite tower structure which is easily assembled and disassembled. The tower may be broken down into relatively few parts and compactly stored and shipped. The hinge structure has been improved to greatly facilitate the assembly of the outer tower.

In addition a convenient means of transporting the tower is provided by a trailer which utilizes a section of the tower structure itself to support the remainder of the tower and connect the trailer to a pulling vehicle.

I claim:
1. A composite tower structure comprising:
   a rigid inner tower;
   an outer tower including a top platform with a plurality of legs pivotably connected thereto;
   said top platform of said outer tower being apertured to allow an upper portion of said inner tower to project therethrough;

said legs of said outer tower being pivotably connected to the top platform thereof by a plurality of separate hinge units, each such hinge unit including a pair of spindles, with each spindle being telescopingly connected with one end of one leg of said outer tower so as to allow pivotable movement of this leg about said spindle; and at least one of said hinge units having separable spindles adapted to be connected together after said separable spindles are telescopically connected with one end of one leg.

2. A composite tower structure as defined in claim 1 wherein each of said separable spindles further include a plate connected thereto, said plates being adapted to abut and be secured to each other.

3. A hinge structure for a tower having a top platform comprising:

a plurality of mutually spaced hinge units detachably mounted upon the lower side of the top platform of said tower and adapted to pivotably support tower legs;

each said hinge unit including a first portion which engages and supports one side of one tower leg so as to allow pivotably movement of said one tower leg in relation to said top platform;

each said hinge unit further including a second portion which engages and supports one side of another tower leg so as to allow pivotable movement of said other tower leg in relation to said top platform;

said first and second portions of each hinge unit being rigidly interconnected, with the pivot axes thereof being mutually inclined; and at least one of said hinge units having said first and second portions detachably connected together so that said first and second portions may be individually engaged with one side of one tower leg and thereafter connected together.

4. A hinge structure for a tower as defined in claim 3 wherein each of said detachably connected first and second portions further include a plate means connected thereto, said plate means being adapted to abut and be secured to each other.

5. A hinge structure for a tower as defined in claim 3:

wherein said first and second hinge portions each comprise spindle members;

wherein each of said spindle members of a said hinge unit having detachably connected portions further include plate means connected thereto;

one of said spindle members having said plate means connected at one end transverse to the axis thereof; and the other of said spindle members having said plate means connected near one end and inclined to the axis thereof.

6. A hinge structure as defined in claim 4:

wherein each hinge unit includes a pair of spaced mounting plates positioned on opposite sides of said interconnected first and second portions of each hinge unit, with there being coupling means extending between said plates and adapted to support a portion of a tower railing; and wherein said mounting plates of said hinge unit having detachably connected portions are positioned on one of said portions and carry said plate means connected to that portion.

7. A method of assembling an outer tower component of a composite tower, which outer tower component includes three legs pivotably connected together by two hinge units each having a pair of rigidly interconnected spindle members, and by one separable hinge unit having detachably secured spindle members, said method comprising:

telescopically engaging said spindle members of said two hinge units with ends of said legs;

telescopically engaging said separable spindle members individually with the remaining ends of said legs; and securing said separable spindle members together to form a third rigid hinge unit.

8. A composite tower structure comprising:

an outer tower including a plurality of legs and an apertured platform;

an inner tower including an upper portion and a lower portion;

said upper portion being detachably connected to said lower portion and adapted to extend through said apertured platform;

a said lower portion including a plurality of legs; and a plurality of rigid truss members adapted to be displaced along the axial length of said legs, and means for detachably interconnecting said legs and said truss members to form said lower portion.

9. A composite tower structure as defined in claim 8 wherein a pair of said legs of said lower portion of said inner tower are rigidly interconnected.

10. A tower structure comprising:

a main panel member including a plurality of rigidly interconnected legs converging towards each other at one end;

a plurality of rigid truss members detachably mounted to said main panel member along its longitudinal length and extending transverse to its longitudinal axis; and a main leg detachably connected along its axial length to said truss members.

11. A tower structure as defined in claim 10:

wherein said main panel member further includes a rigid top member connected to said one end and extending substantially transverse to the longitudinal axis of a said panel member; and wherein said main leg is detachably connected to said rigid top member.

12. A tower structure as defined in claim 11 wherein said truss members are triangular in shape and include a mounting member at each corner adapted to abut and be detachably connected to said legs of said main panel member and to said main leg.

13. A tower structure as defined in claim 12:

wherein si said legs are hollow tubes and include a plurality of stop members along their axial lengths; and wherein said mounting members are semicylindrical in shape and are adapted to wrap around said legs and rest on said stop members.

14. A tower structure as defined in claim 13 wherein said truss members include a plurality of side members connected at each corner to said mounting members and connected at two corners to each other.

15. A method of storing a composite tower structure which includes inner and outer tower components, said method comprising:

pivoting legs of said outer tower component outwardly so as to bring the extremities of said leg into a diverged relationship;

inserting a base portion of said inner tower component into the space between said diverged legs of the outer tower; and advancing said inner tower component into the space between said legs of said outer tower component until said base portion abuts a platform mounted on the end of said outer tower component.

16. Apparatus for transporting a composite tower structure which includes an inner and outer tower component, said apparatus comprising:

a trailer including a pair of wheels rotatably secured to opposite ends of an axle;

support means carried by said axle for detachably holding a section of a composite tower structure;

hitch means for engaging said section; and said hitch means including means to connect said section to a pulling vehicle.

17. Apparatus as described in claim 16 wherein the remainder of said outer tower component and the inner tower component are supported by said section.

18. Apparatus as described in claim 16 wherein said support means includes:

a forwardly extending member having a horizontally extending support; and a rearwardly extending member having upright supports.

19. A method for supporting a composite tower structure which includes inner and outer tower components for transport, said method comprising:
- detachably mounting a leg of said outer tower component on a trailer; supporting said inner tower component on said mounted leg, nested between other legs of said outer tower component;
- engaging a hitch to said mounted leg; and
- connecting said hitch to a pulling vehicle.

20. A method for supporting a composite tower structure which includes inner and outer tower components for transport, said method comprising:
- detachably mounting a main panel member of said inner tower component on a trailer;
- converging pivotable legs of said outer tower;
- inserting said converged legs through a triangular base portion of said inner tower with the remainder of said outer tower being supported above said main panel;
- engaging a hitch to a hitch adapter connected to said main panel member; and
- connecting said hitch to a pulling vehicle.

21. Apparatus for transporting a composite tower structure which includes an inner and outer tower component, said apparatus comprising:
- a trailer including a pair of wheels rotatably secured to opposite ends of an axle;
- support means including a forwardly extending member having a horizontally extending support and a rearwardly extending member having upright supports carried by said axle for holding a section of a composite tower structure;
- said section comprising one of a plurality of pivotable legs of said outer tower component with a lower portion of said one leg being detachably connected to said horizontally extending support and platform supporting members extending from an upper portion of said one leg being detachably connected to said upright supports;
- hitch means for engaging said section; and
- said hitch means including means to connect said section to a pulling vehicle.

22. Apparatus as described in claim 21 wherein said hitch means is telescopically engaged by said one leg.

23. Apparatus for transporting a composite tower structure which includes an inner and outer tower component, said apparatus comprising:
- a trailer including a pair of wheels rotatably secured to opposite ends of an axle;
- support means including a forwardly extending member having a horizontally extending support and a rearwardly extending member having upright supports carried by said axle for holding a section of a composite tower structure;
- hitch means for engaging said section;
- said hitch means including means to connect said section to a pulling vehicle;
- a horizontally extending adapter connected to said upright supports; and
- a laterally extending adapter connected to said horizontally extending support.

24. Apparatus as described in claim 23:
- wherein said section comprises a panel member of said inner tower component;
- wherein a lower portion of said panel member is detachably connected to said horizontally extending adapter; and
- wherein a midportion of said panel member is detachably connected to said laterally extending adapter.

25. Apparatus as described in claim 24 wherein said hitch means is telescopically engaged by a hitching adapter detachably connected to said panel member.